United States Patent [19]

Zajicek et al.

[11] Patent Number: 4,866,731
[45] Date of Patent: Sep. 12, 1989

[54] ELECTRIC FURNACE ARRANGEMENT

[75] Inventors: Ernst Zajicek, Ottensheim; Ernst Riegler, Enns; Hubert Hammerschmid, Linz, all of Austria

[73] Assignee: Voest-Alpine Aktiengesellschaft, Linz, Austria

[21] Appl. No.: 193,896

[22] Filed: May 12, 1988

[30] Foreign Application Priority Data

May 15, 1987 [AT] Austria .................................. 1234/87

[51] Int. Cl.[4] .............................................. H05B 7/02
[52] U.S. Cl. ......................................... 373/73; 373/81
[58] Field of Search ............... 432/157, 160, 238, 250; 373/74, 84, 81, 73, 79

[56] References Cited

U.S. PATENT DOCUMENTS

| | | | |
|---|---|---|---|
| 1,992,465 | 2/1935 | Blagg | 373/74 |
| 2,396,663 | 3/1946 | Kuehlthau et al. | 373/81 |
| 2,472,954 | 6/1954 | Moore | 373/81 |
| 2,886,617 | 5/1959 | Sorg et al. | 373/84 |
| 4,476,564 | 10/1984 | Buhler | 373/81 |
| 4,617,672 | 10/1986 | Enkner et al. | 373/81 |

Primary Examiner—Roy N. Envall, Jr.

Attorney, Agent, or Firm—Hopgood, Calimafde, Kalil, Blaustein & Judlowe

[57] ABSTRACT

An electric furnace includes a furnace vessel covered by a furnace lid liftable and lowerable by a lid lifting mechanism and pivotable from a position above the furnace vessel into a position lateral of the furnace vessel and back by a lid pivoting mechanism. A lid supporting framework is pivotably mounted lateral of the furnace vessel and includes at least one lid bracket extending over the furnace vessel for lifting, lowering and pivoting the furnace lid. In order to be able to pivot the lid bracket without furnace lid and without necessitating manipulations to be carried out at the furnace lid for the purpose of exchanging the lid or the lid core, the lid bracket is detachably connected to the furnace lid by at least one coupling means, with a coupling piece of the coupling means being arranged on the lid bracket and a coupling counter piece of the coupling means being arranged on the furnace lid. The coupling piece or the coupling counter piece includes a lateral recess extending in the pivoting direction of the lid supporting framework, through which the coupling counter piece is capable of being assembled with the coupling piece from aside.

7 Claims, 3 Drawing Sheets

ELECTRIC FURNACE ARRANGEMENT

The invention relates to an electric furnace, such as an electric arc furnace or a plasma furnace, comprising a furnace vessel covered by a furnace lid liftable and lowerable by a lid lifting mechanism and pivotable from a position above the furnace vessel into a position lateral of the furnace vessel and back by a lid pivoting mechanism, wherein a lid supporting framework pivotably mounted lateral of the furnace vessel and including at least one lid bracket extending over the furnace vessel is provided for lifting, lowering and pivoting the furnace lid.

Electric furnaces of this type are described in DE-A No. 1 508 471 and in DE-B - No. 1 216 900. With the known electric furnaces, the furnace lid is suspended on tension rods hinged to angle levers arranged on the furnace lid on the one hand, and to angle levers arranged on the lid bracket, on the other hand, which angle levers are pivotable by means of rods to be actuated by a pressure medium cylinder such that the tension rods and, thus, the furnace lid are lifted and lowered. By arrangements of this type, the furnace lid may be moved in the vertical direction and, in the lifted position, may be pivoted into a position lateral of the vessel, and back.

Difficulties occur as the furnace lid is to be set free or removed, e.g., for the purpose of exchanging the furnace lid another lid. With the known arrangements, operating personnel, in such a case, must detach the hinge means of the tension rods of the furnace lid so that the lid brackets can be pivoted into a position lateral of the vessel and at the same time release the furnace lid. Such manipulations on the furnace vessel not only are cumbersome, but also involve risks to the operating personnel.

Furthermore, special difficulties will arise if a fumes bend or conduit is provided as a part of the furnace lid, because the former also must be detached from the furnace lid by the operating personnel in order to enable the pivoting of the lid brackets when the furnace lid is detached.

The invention aims at avoiding these disadvantages and difficulties and has as its object to design an electric furnace of the initially defined kind with the object of enabling the pivoting of the lid brackets optionally with or without furnace lid and without requiring additional manipulations by the operating personnel.

In accordance with the invention, this object is achieved in that the lid bracket is detachably connected to the furnace lid by at least one coupling means, with a coupling piece or member of the coupling means being arranged on the lid bracket and a coupling counter piece or member of the coupling means being arranged on the furnace lid, and wherein the coupling piece or the coupling counter piece includes a lateral recess extending in the pivoting direction of the lid supporting framework, through which the coupling counter piece is capable of being assembled with the coupling piece from the side.

Preferably, the coupling piece is designed as a part of the lid lifting mechanism and as a lid carrying rod vertically movably mounted on the lid bracket and provided with a lid lifting plate on its free end, and the coupling counter piece is designed as a supporting plate rigidly arranged on the furnace lid and having a passage opening for the lid carrying rod, the supporting plate being provided with the lateral recess reaching as far as to the passage opening.

According to a further object of the invention, pivoting of the lid brackets with the furnace lid detached is feasible also with a fumes bend or conduit arranged on the furnace lid, without the fumes bend or conduit constituting an impediment. This further object suitably is achieved by providing two lid brackets on the lid supporting framework, on whose ends a transverse beam carrying a fumes bend or conduit may be disposed and which is movable in the vertical direction by pressure medium cylinders of the lid lifting mechanism arranged on either ends, wherein the piston rods of the pressure medium cylinders carrying the lid carrying rods are connected to the transverse beam.

Advantageously, the transverse beam is connected on each of its ends with a vertically oriented standard guided in the vertical direction on one lid bracket each, preferably by means of guiding rollers.

In order to avoid oscillations during pivoting of the furnace lid, a counter supporting surface suitably is provided on the lid bracket opposite the supporting plate, in the lifting direction of the furnace lid, at which the supporting plate is pressable with the furnace lid when lifted, the supporting plate advantageously including a recess to receive the counter supporting surface with the furnace lid when lifted.

The invention will now be explained in more detail by way of one exemplary embodiment and with reference to the accompanying drawings, wherein.

Figure 1:
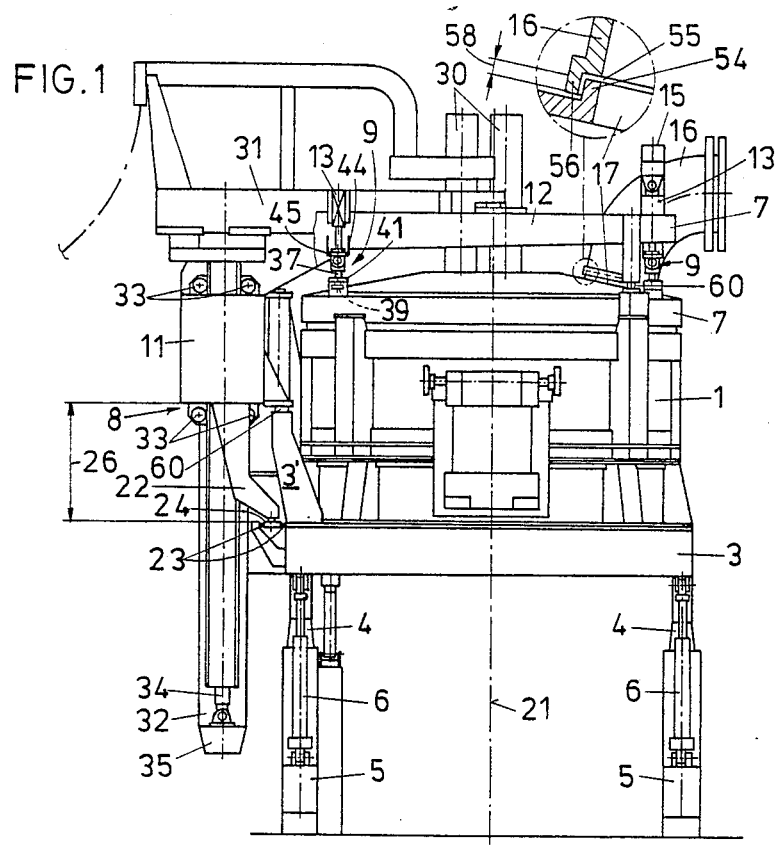
FIG. 1 is a side view of an electric furnace according to the invention.

A furnace vessel 1 of an electric arc furnace including an eccentric bottom tap 2 rests on a rocking frame 3 mounted on antifriction tracks 4 provided on the upper end of concrete cheeks or supports 5 arranged on the base. Pressure medium cylinders 6 arranged on the concrete cheeks or supports 5 on the one hand, and on the rocking frame 3 on the other hand, serve to tilt the furnace vessel 1.

During operation of the furnace, the furnace vessel 1 is covered by a water-cooled furnace lid 7. This furnace lid 7 is liftable and lowerable by means of a lid supporting framework 8 and also is pivotable. The lid supporting framework 8 is equipped with a lid lifting mechanism 9 for lifting and lowering the furnace lid 7, and a lid pivoting mechanism 10 is provided for pivoting the furnace lid 7 from an operating position above the furnace vessel 1 into a charging position lateral of the furnace vessel 1, and back.

The lid supporting framework 8 comprises a supporting framework box 11, to whose upper side two lid brackets 12 are fastened, reaching over the furnace lid 7. Between the lid brackets 12 and the furnace lid 7, pressure medium cylinders 13 are arranged on four placements or spots, forming the lid lifting mechanism 9. A fumes bend or conduit 16, which extends from exhaust opening 17 of the furnace lid 7, may be supported on the cantilevering ends 14 of the lid brackets 12 by means of a transverse beam 15.

Figure 2:
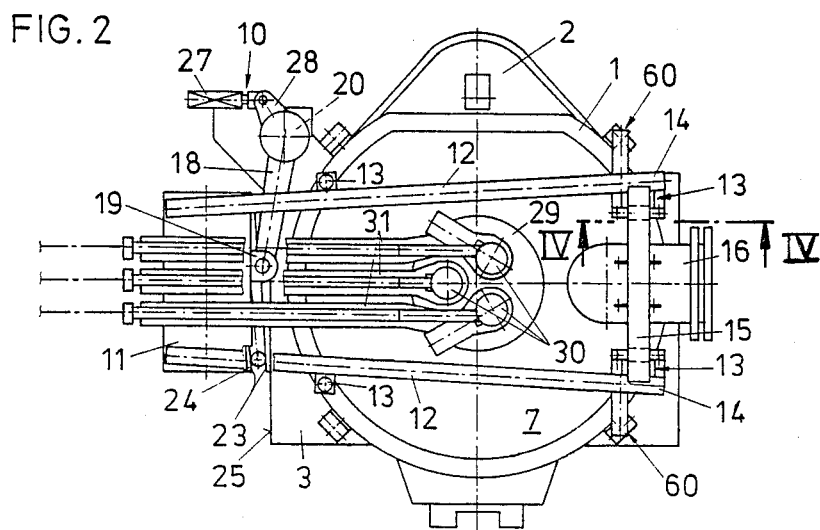
FIG. 2 is a top view on this electric furnace.

The supporting framework box 11 is designed as the coupler of a thrust crank whose oscillating crank 18 is hinged at one end to an arm 19 cantilevering on the supporting framework box 11 in the direction towards the furnace vessel 1, its other end being pivotably mounted on a column 20 rigidly mounted on the rocking frame 3 and directed approximately parallel to the central axis 21 of the furnace. Furthermore, a guiding arm 22 is rigidly fastened to the supporting framework box 11, to whose freely cantilevering end is mounted a catch 24 designed, for instance, as a roller, engaging a guide 23 arranged on the rocking frame 3. The guide 23 preferably is designed straight, extending approximately parallel or at an acute angle to side 25 (FIG. 2) of the rectangularly designed rocking frame 3 on which the lid supporting framework 8 is arranged. The guide 23 and the catch 24 are located approximately at the level of the rocking frame 3. Since the supporting framework box 11 is arranged above the rocking frame 3, both the guiding arm 22 and the oscillating crank 18 have a vertical extension 26 reaching from the rocking frame 3 as far as to the supporting framework box 11.

To pivot the furnace lid 7, the oscillating crank 18 is pivotable about the column 20 by means of a pressure medium cylinder 27, which pressure medium cylinder 27 engages the rocking frame 3, on the one hand, and a projection 28 of the oscillating crank 18, on the other hand.

The electrodes 30 which pass through the lid core 29 provided in the center of the furnace lid 7 are retained by electrode brackets 31 directed from the electrodes 30 in the direction towards the supporting framework box 11 and passing through the supporting framework box 11 with vertical standards 32. Guiding rollers 33 are arranged on the upper and lower sides of the supporting framework box 11 to guide these standards 32. Lifting and lowering of the electrodes 30 is effected by means of pressure medium cylinders 34 arranged within the standards 32 and engaging, with their outwardly projecting ends, a downwardly directed U-shaped strap 35 annexed to the supporting framework box 11.

The pressure medium cylinders 13 constituting the lid lifting mechanism 9 are each rigidly fastened to the lid brackets 12. Lid carrying rods 37 (note FIG. 4) are each articulately fastened to the downwardly directed piston rods 36 such that production inaccuracies and expansion variations of the furnace lid 7, etc., may be balanced out. The articulation axis 38 of the articulation of the lid carrying rods 37 is directed horizontal and approximately perpendicular to the longitudinal extension of the lid brackets 12.

On the lower end of each lid carrying rod 37, a lid lifting plate 39 is provided. The lid carrying rod 37 forms a coupling piece with the lid lifting plate 39, which coupling piece is engageable with, and disengageable from, a coupling counter piece arranged on the furnace lid and formed by a console 40 comprising an approximately horizontally arranged supporting plate 41, by pivoting the lid brackets 12. To engage and disengage the coupling piece or member, the coupling counter piece or member (see FIGS. 4 and 5), i.e., the supporting plate 41, has a lateral recess 43 extending from a central passage opening 42 and directed in the pivoting direction of the lid brackets 12 (i.e., in case the lid brackets 12 are pivoted from above the furnace lid 7 into a position laterally beside the furnace lid 7), which recess is designed to widen angularly outwards.

On each lid bracket 12, a counter supporting surface 45 aligned in parallel with the supporting plate 41 is arranged on a console 44 concentrically with the axis of the pressure medium cylinder 13, through which the piston rod 36 is passed and pressed at the supporting plate 41 of the console 40 fastened to the furnace lid 7 with the furnace lid 7 lifted. For a better centering of the furnace lid 7 in the lifted state, two of the supporting plates 41, on their upper sides, are each provided with a recess 46 adapted to the counter supporting surface 45 and receiving the counter supporting surface with the furnace lid lifted. Thereby, the furnace lid 7, in the lifted state, may be pivoted away from the furnace vessel 1 and back to the same by the aid of the lid brackets 12 without any risk of oscillating or slanting caused by buffing on scrap charged into the furnace vessel 1.

Figure 4:
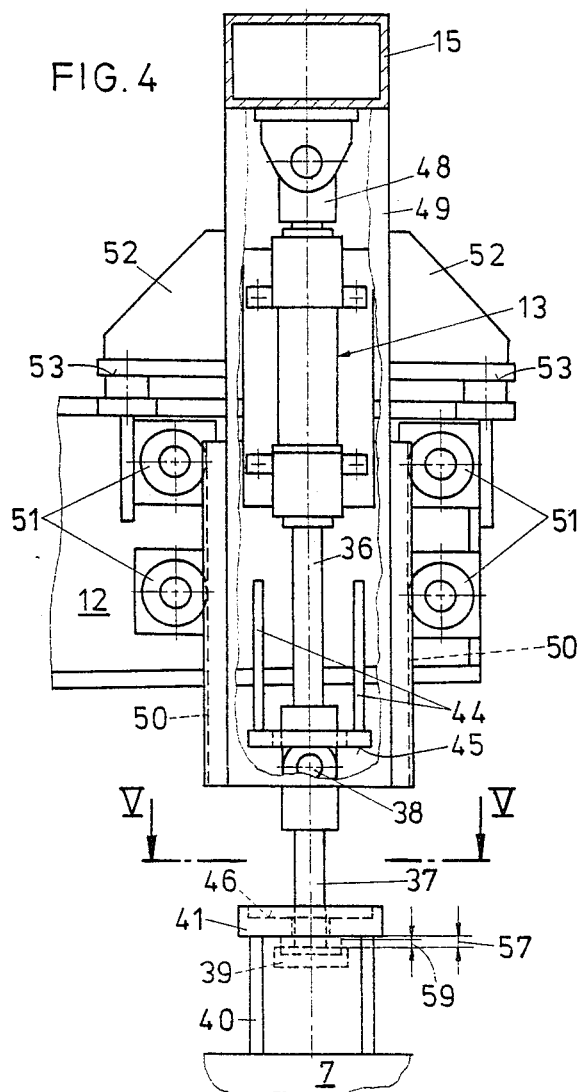
FIG. 4 is a partially sectioned detailed view according to the arrow IV of FIG. 2.
Figure 5:
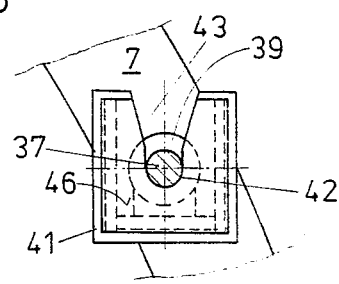
FIG. 5 is a sectioned illustration along line V—V of FIG. 4.

The two pressure medium cylinders 13 arranged on the ends 14 of the two lid brackets 12, which are illustrated in detail in FIG. 4, are equipped with a through-going piston rod 36, whose upper end 48 projecting out of the pressure medium cylinder 13 is hinged to the transverse beam 15. On its ends, the transverse beam 15 comprises standards 49 each extending vertically downwards and guided at guiding rollers 51 arranged on the ends 14 of the lid brackets 12, by means of guide rails 50.

To support the transverse beam 15 on the lid brackets 12, laterally cantilevering consoles 52 are provided on the vertically downwardly directed standards 49, resting on abutting surfaces 53 of the lid brackets 12 as soon as the transverse beam 15 has reached its lowermost position, i.e., when the fumes bend conduit 16 is in the operating position. In this position, a vertically extending gap 55 (note FIG. 1) is provided between the fumes bend or conduit 16 and a ledge 54 arranged on the furnace lid 7 about the exhaust opening 17, yet this gap is covered by a collar 56 arranged laterally on the fumes bend or conduit 16, in order to prevent offgas flames from striking out during operation of the furnace.

With the furnace lid 7 placed on the furnace vessel 1, the lid lifting plates 39 are below the supporting plate 41 at a distance 57 that is dimensioned to be larger than the height 58 of the collar 56 covering the gap 55 between the fumes bend or conduit 16 and the exhaust opening 17 such that by moving the piston rods 36 of the pressure medium cylinders 13 arranged on the ends 14 of the brackets 12 by an extent 59 that is slightly larger than the height 58 of this collar 56 (shown in FIG. 1), the fumes bend or conduit 16 is released from the furnace lid 7 by lifting the transverse beam 15, however, before lid lifting plate 39 has contacted supporting plate 41.

Actuation units 60 (shown in FIGS. 1 and 2), which are designed as pressure medium cylinders, serve to support the lid brackets 12 when the furnace lid 7 is placed on the furnace vessel 1, two of these actuation units being arranged between the furnace vessel and the ends 14 of the brackets 12 and one being arranged between the supporting framework box 11 and a standard 3' provided on the rocking frame 3 and projecting vertically upwards.

Figure 3:
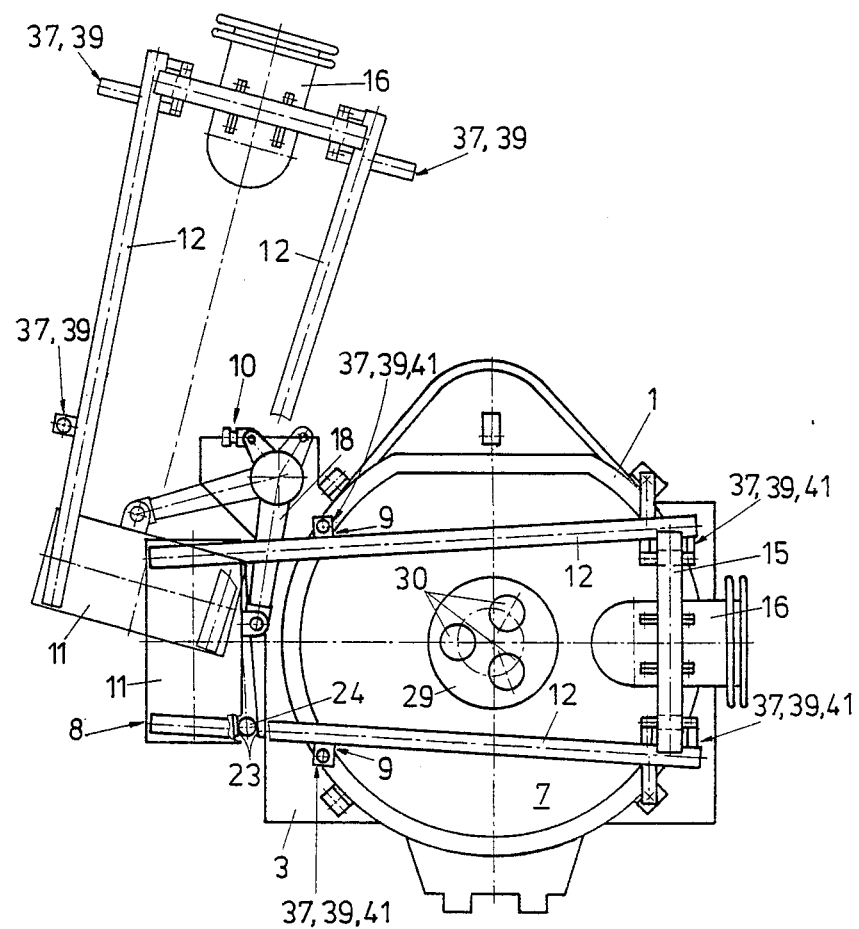
FIG. 3 represents the pivoting of the lid brackets with the furnace lid detached compared to the position shown in FIG. 2.

If the furnace lid 7 is to be removed from the furnace vessel 1, e.g., in order to exchange it for an intact furnace lid, it is proceeded in the following manner:

At first, the actuation units 60 are released, thus setting free the lid brackets 12 with respect to the furnace vessel 1. Then, the pressure medium cylinders 13 arranged on the ends of the lid brackets 12, upon lifting or removal of the electrodes 30, are actuated to such an extent that the piston rods 36 and, thus, the transverse beams 15 are lifted to a distance 59 (FIG. 4), together with the fumes bend or conduit 16 fastened thereto. The two other pressure medium cylinders 13 remain released. Thereby, the lid supporting framework 8 is pivotable into the position laterally beside the furnace vessel 1, seen from above and illustrated in FIG. 3, carrying with it the fumes bend or conduit 16. In doing so, the lid carrying rods 37 automatically slide outwards through the lateral recesses 43 so that the furnace lid 7 is decoupled from the lid supporting framework.

After having put on an intact furnace lid 7 (or having inserted a new lid core 29) and pivoted back the lid supporting framework 8, the lid carrying rods 37 slide through the lateral recesses 43 of the coupling counter pieces until the lid carrying rods 37 reach through the central passage openings 42 of the supporting plate 14. By actuating the pressure medium cylinders 13, it is then possible to lift and lower the furnace lid 7 as well as to pivot it aside in the lifted state by pivoting the lid brackets 12.

The invention is not limited to the embodiment illustrated in the drawings, but may be modified in various aspects. For instance, it is possible to apply the invention to a plasma furnace. The invention may also be used with stationary furnaces, i.e., furnaces having a stationary furnace platform, e.g., desigend as a pedestal. The coupling piece and the coupling counter piece may be of any design, the lid carrying rod 37 may, for instance, be mounted to the furnace lid 7 and the coupling counter piece may be mounted to the piston rod 36 of the pressure medium cylinder.

As will be apparent, other variants for the coupling piece or member and the coupling counter piece or member may be employed. What is essential is that these two parts or members are detachable from, and engageable with, each other by a lateral pivoting movement of the lid brackets with the lid supporting framework being released or partially released. The pressure medium cylinders used to lift the lid need not necessarily be arranged on the lid brackets, but they may also be provided lateral of the furnace vessel, effecting lifting and lowering of the lid carrying rods or of the lid brackets via rods.

What we claim is:

1. In an electric furnace arrangement, such as an electric furnace or a plasma furnace, of the type including
    a furnace vessel,
    a furnace lid covering said furnace vessel,
    a lid supporting framework pivotably mounted lateral of said furnace vessel for lifting, lowering and pivoting said furnace lid and including at least one lid bracket with its ends extending across said furnace vessel, a lid lifting mechanism for lifting and lowering said furnace lid and a lid pivoting mechanism for pivoting said furnace lid from a position above said furnace vessel to a position lateral of said furnace vessel and back, the improvement comprising:
    at least one detachable coupling means cooperably associated with at least one bracket and said furnace lid;
    said coupling means including a coupling member and a coupling counter member,
    one member of said coupling means being connected to said lid bracket and the other member of said coupling means being connected to said furnace lid,
    one coupling member as the coupling counter member being provided with a lateral recess, and the other coupling member being provided with means for cooperatively engaging said recess by lateral movement of one respect to the other,
    and wherein said coupling members are engaged or disengaged by means of a pivoting mechanism for pivoting said at least one bracket from a position over the furnace lid to a position lateral thereof.

2. An electric furnace arrangement as set forth in claim 8, wherein one of said coupling members is designed as a part of said lid supporting framework and as a lid carrying rod mounted to be vertically movable on said lid bracket and having a free end, a lid lifting plate being provided on said free end, and wherein said coupling counter member is designed as a supporting plate rigidly arranged on said furnace lid and having a passage opening including a lateral recess for said lid carrying rod, said lateral recess in said supporting plate extending as far as to said passage opening.

3. An electric furnace arrangement as set forth in claim 2, comprising two lid brackets provided on said lid supporting framework, a fumes conduit, and a transverse beam with opposed ends and carrying said fumes conduit disposed at the ends of said lid brackets, a pressure medium cylinder of said lid lifting mechanism being arranged on either end of said transverse beam to move said transverse beam in the vertical direction and including a piston rod carrying said lid carrying rod, said piston rod being connected to said transverse beam.

4. An electric furnace arrangement as set forth in claim 3, further comprising a vertically oriented standard provided on either end of said transverse beam and guided on said lid bracket in vertical direction.

5. An electric furnace arrangement as set forth in claim 4, further comprising guiding rollers for guiding said standard.

6. An electric furnace arrangement as set forth in claim 2, further comprising a counter supporting surface provided on said lid bracket opposite said supporting plate in the lifting direction of said furnace lid, said supporting plate being pressable at said counter supporting surface with said furnace lid lifted.

7. An electric furnace arrangement as set forth in claim 6, wherein a recess is provided in said supporting plate at its upper surface to receive said counter supporting surface with said furnace lid lifted.

* * * * *

UNITED STATES PATENT AND TRADEMARK OFFICE
CERTIFICATE OF CORRECTION

PATENT NO.  : 4,866,731
DATED       : September 12, 1989
INVENTOR(S) : ERNST ZAJICEK et al It is certified that error appears in the above-identified patent and that said Letters Patent is hereby corrected as shown below:

In column 6, line 22 of claim 2, "claim 8" should be

-- claim 1 -- .

Signed and Sealed this

Twentieth Day of February, 1990

Attest:

JEFFREY M. SAMUELS

*Attesting Officer*    *Acting Commissioner of Patents and Trademarks*